United States Patent [19]
Mercke et al.

[11] Patent Number: 6,025,694
[45] Date of Patent: Feb. 15, 2000

[54] BATTERY PACK FOR A PORTABLE ELECTRIC APPARATUS AND A METHOD FOR THE CHARGING THEREOF

[75] Inventors: Johan Mercke; Björn Frännhagen, both of Lund, Sweden

[73] Assignee: Telefonaktiebolaget LM Ericsson, Stockholm, Sweden

[21] Appl. No.: 08/974,953

[22] Filed: Nov. 20, 1997

[30] Foreign Application Priority Data

Nov. 20, 1996 [SE] Sweden .................................. 9604248

[51] Int. Cl.[7] ........................... H01M 10/46; H01M 10/44
[52] U.S. Cl. ............................................. 320/106; 320/134
[58] Field of Search .................................. 320/106, 107, 320/110, 112, 132, 134, 136, 161, FOR 114, FOR 138, FOR 147, DIG. 21

[56] References Cited

U.S. PATENT DOCUMENTS

| | | | |
|---|---|---|---|
| 4,684,870 | 8/1987 | George et al. .......................... | 320/140 |
| 4,885,523 | 12/1989 | Koenck ................................... | 320/131 |
| 4,965,738 | 10/1990 | Bauer et al. ............................ | 320/136 |
| 5,534,765 | 7/1996 | Kreisinger et al. .................... | 320/106 |

FOREIGN PATENT DOCUMENTS 621 649  10/1994  European Pat. Off. .
WO94/00888  1/1994  WIPO .

*Primary Examiner*—Edward H. Tso
*Attorney, Agent, or Firm*—Burns, Doane, Swecker & Mathis, L.L.P.

[57] ABSTRACT

A battery pack for a portable electric apparatus has one or more than one battery cells and terminals for electric connection to the apparatus. The battery pack has a first terminal for receiving charging current from the apparatus, a second terminal for feeding supply current to the apparatus, and a third terminal for establishing a zero or ground line common to the apparatus and the battery pack. Furthermore, the battery pack has a first voltage converter arranged between the first terminal and the battery cell(s), and a second voltage converter arranged between the second terminal and the battery cell(s).

17 Claims, 4 Drawing Sheets

BATTERY PACK FOR A PORTABLE ELECTRIC APPARATUS AND A METHOD FOR THE CHARGING THEREOF

BACKGROUND

The present invention relates to a battery pack for a portable electric apparatus, comprising at least one battery cell and terminals for electric connection to the apparatus, and furthermore the present invention relates to a method for charging such a battery pack.

Battery packs of the kind described above are used as power supplies for e.g. wireless radio telephones, such as mobile telephones. Normally, such a battery comprises a number of battery cells with a certain terminal voltage, said cells being connected in series with each other so as to provide a supply voltage suitable for driving the electric and electronic components in the mobile telephone. Common battery cell types are NiCd and NiMH. If for instance five NiMH cells are used, a supply voltage of between 5 and 6 V may be obtained. The development of more compact and less power-consuming components has opened up the possibility of driving the electronic circuits in the mobile telephone at a lower supply voltage than before. Consequently, NiMH batteries with for instance four cells may be used, thereby providing a supply voltage of about 4 V. Three NiMH cells will provide a supply voltage of about 3 V, which is sufficient to drive modern CMOS integrated circuits.

Another type of batteries uses lithium-based cells. A lithium cell has a terminal voltage of around 3.6 V but should be charged at a higher voltage of around 4.2 V. As a consequence, a lithium battery with two cells must be charged at a relatively high voltage of about 8.5 V, while the electronic circuits in the mobile telephone only require a supply voltage, which is approximately half as large as aforesaid voltage.

Throughout this document the invention will be exemplified as a battery pack for a mobile telephone in any common cellular mobile telecommunication system, such as GSM. However, it is to be emphasized that the invention is applicable also for other types of portable battery-powered electric apparatuses, the batteries of which are arranged to be charged during ongoing apparatus operation. Examples of such electric apparatuses are portable computers (so called lap-top or palm-top computers), personal digital assistants (PDA), hand-carried communication units, etc.

FIG. 1 illustrates a conventional arrangement for charging a battery pack 10 with battery cells 11a, 11b for a mobile telephone 20 during ongoing operation. The mobile telephone 20 comprises electronic circuits 22, which require a certain supply voltage of, say, z V. The electronic circuits 22 comprise components such as power amplifiers, local oscillator, mixer, filter circuits, etc, said components being well-known in the technical field and are therefore not described in more detail herein. The battery pack 10 has a terminal voltage of y V, which is dependent on the cell voltage of the individual battery cells 11a, 11b. The battery has to be charged at a voltage x V, where x as described above is higher than y, which in turn may be considerably higher than z. Furthermore, the battery pack 10 comprises a safety device 12, the purpose of which is to prevent the battery cells 11a, 11b from being exposed to an excessively high voltage from a charging device 30. Other safety devices may be arranged for corresponding protection of the electronic circuits 22.

The arrangement according to FIG. 1 has a disadvantage in that the voltage-sensitive electronic circuits 22 may accidentally be exposed to dangerous voltage levels, if for some reason a fault would occur anywhere in the arrangement. For instance, the battery may unintentionally be removed from the mobile telephone. The safety device may comprise a fault, which prevents the safety device from releasing in response to an occurred fault condition. In such a case there is an apparent risk that the electronic circuits 22 will be damaged in response to an excessively high supply voltage of x V from the charging device 30.

Another disadvantage of a conventional charging arrangement according to the above is that a given mobile telephone model is generally only able to use batteries of a certain type. One reason for this is that different battery types have completely different charging characteristics during the charging process. For instance, NiMH-type batteries have voltage characteristics, which are schematically illustrated in FIG. 2. During constant current charging the terminal voltage u of the battery increases with time t, as shown in FIG. 2. When the battery approaches a fully charged state, at a time $t_f$, the voltage characteristics exhibit an increased terminal voltage u during a short period of time, followed by a decreased terminal voltage u. This fact, i.e. the fact that the battery terminal voltage exhibits a negative voltage derivative, when the battery has reached a fully charged state, is commonly used for controlling the charging process. According to this method, which is referred to as "-dV" (minus delta volt), the charging is aborted, once the characteristic change in sign has occurred for the terminal voltage characteristics.

FIG. 3 illustrates the terminal voltage characteristics when charging a lithium type battery. Such a battery is normally charged in two steps, the first of which being carried out at constant current ("CC"). Starting at a point in time $t_0$ the battery is hence supplied with constant current under surveillance of the terminal voltage u. When the terminal voltage reaches a certain value $u_1$ at a point in time $t_1$, the charging process enters the next step, namely charging at constant voltage ("CV"). The battery, which gets fully charged at a point in time $t_f$, does not exhibit any characteristic voltage peak of the type disclosed in FIG. 2, and consequently this criterion cannot be used for controlling the charging process (particularly the ending thereof).

Since the battery types illustrated in FIG. 2 and FIG. 3, respectively, exhibit remarkably different charging characteristics, it has been difficult in the prior art to make batteries of both types available for use with the same mobile telephone model.

SUMMARY

A first object of the present invention is to provide a battery pack, the battery cells of which may be charged at a first voltage, while the electronic circuits in the portable electric apparatus may be driven at a second voltage, at the same time reducing or eliminating the risk of an unintentional exposure of these electronic circuits to an excessively high voltage from the charging device.

A second object of the invention is to provide a battery pack with a standardized interface to the apparatus, thereby making it possible to use several different battery types—even fundamentally different battery types.

A third object is to provide a battery pack with a standardized interface for bidirectional communication with the apparatus, with respect to controlling the charging process as well as reporting the momentary charging status of the battery pack.

The objects described above are achieved by a battery pack for a portable electric apparatus, comprising one battery cell or a plurality of battery cells and terminals for electric connection to the apparatus, a first terminal being arranged to receive charging current from the apparatus, a second terminal being arranged to feed supply current to the apparatus, and a third terminal being arranged to establish a zero or ground line common to the apparatus and the battery pack. A first voltage converting means is arranged between the first terminal and the battery cell(s), and a second voltage converting means is arranged between the second terminal and the battery cell(s).

Furthermore, the objects above are achieved by a method for charging one battery cell or a plurality of battery cells in a battery pack for a portable electric apparatus, wherein charging current/voltage is supplied by the apparatus to the battery pack together with charging control information and wherein supply current/voltage is supplied by the battery pack to the apparatus together with information regarding the momentary charging status of the battery cell(s).

BRIEF DESCRIPTION OF THE DRAWING

The invention will now be described as embodiment examples, reference being made to the accompanying drawings, in which.

DETAILED DESCRIPTION

Figure 4:
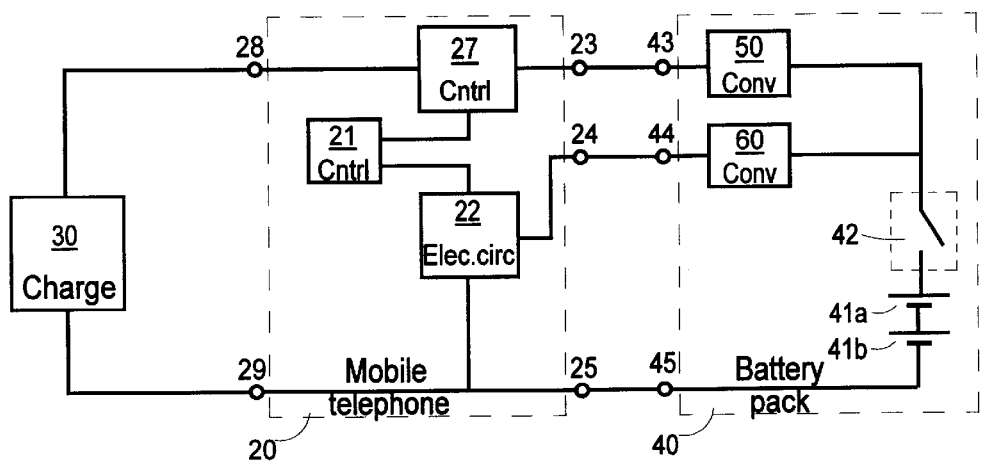
FIG. 4 is a schematic block diagram illustrating a preferred embodiment of the present invention.

In FIG. 4 the basic arrangement for charging a battery pack according to the present invention is schematically illustrated. A battery pack 40 is attached to a radio telephone 20, such as a mobile telephone. The battery pack 40 has three terminals for connection to the radio telephone: a first terminal 43 for connection to a first terminal 23 in the radio telephone, a second terminal 44 for connection to a second terminal 24 in the radio telephone, and a third terminal 45 for connection to a third terminal 25 in the radio telephone.

Furthermore, the battery pack has a number of battery cells 41a, 41b connected in series with each other. Two battery cells are shown in the drawing, but more than as well as less than two battery cells may be used depending on the battery cell type and the application in question. In the following the battery cells 41a, 41b are assumed to be of lithium type with a cell voltage of around 3.6 V each. The positive terminal of the first battery cell 41a is connected to a safety device 42, and the negative terminal of the battery cell 41a is connected to the positive terminal of the second battery cell 41b. The negative terminal of the second battery cell 41b is connected to the third battery pack terminal 45 for establishing a ground or zero line common to the radio telephone 20 and the battery pack 40 through the radio telephone terminal 25. Hence, the third battery pack terminal 45 serves as a ground terminal.

A first voltage converting means 50 is connected between the first battery pack terminal 43 and the safety device 42. A second voltage converting means 60 is connected, in parallel to the first voltage converting means 50, between the second battery pack terminal 44 and the safety device 42. As will be described in more detail below, the first battery pack terminal 43 is arranged to receive charging current from the first terminal 23 of the radio telephone 20, while the second battery pack terminal 44 is arranged to feed supply current to the second radio telephone terminal 24 for providing power to the electronic circuits 22 in the radio telephone. Furthermore, the radio telephone 20 is provided with a positive terminal 28 and a negative terminal 29, by means of which a charging device 30 may be connected to the radio telephone. A charging controller 27 is arranged to receive charging current from the charging device 30 and to supply charging current to the battery pack 40 via the radio telephone terminal 23 and the first battery pack terminal 43 under control from a controller 21.

The three battery pack terminals 43–45 are arranged, from a mechanical point of view, so that the electric connection between the ground terminal 45 and the corresponding radio telephone terminal 25 is interrupted only once the connection has been interrupted between the battery pack terminals 43 and 44, respectively, and the corresponding radio telephone terminals 23 and 24, respectively, when the battery pack 40 is removed from the radio telephone 20.

The controller 21 may be realized by the central processing unit normally provided in a radio telephone or by a separately arranged microprocessor, etc, and the controller 21 is operatively connected to the second radio telephone terminal 24, thereby being receptive to information regarding the momentary charging status of the battery cells 41a, 41b. Using this information the controller 21 is arranged to control the charging controller 27 in a way, so that a desired charging process is obtained, as will be described in more detail below.

Figure 1:
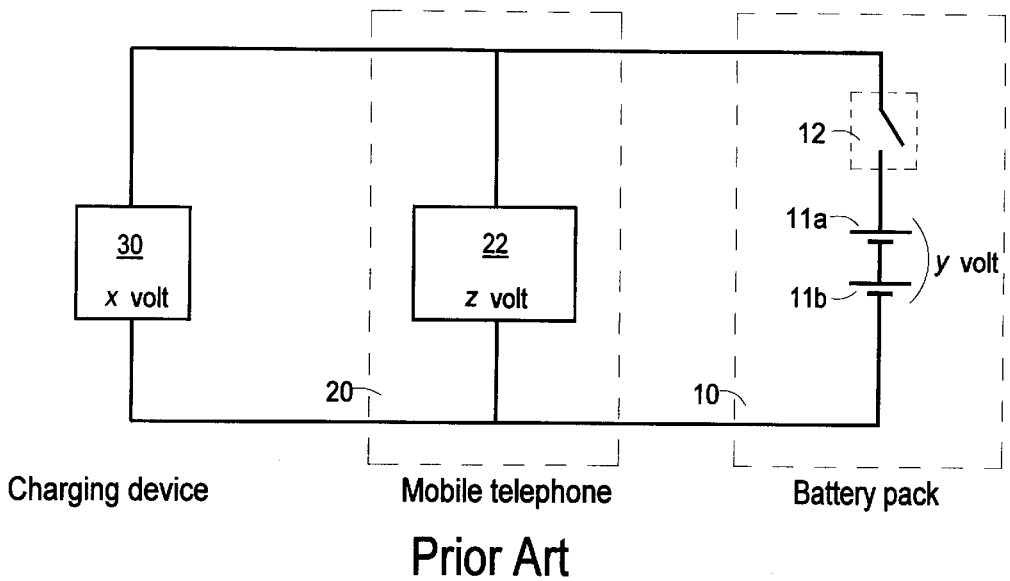
FIG. 1 is a schematic block diagram illustrating a conventional arrangement for charging a battery pack during ongoing use of a radio telephone.
Figure 2:
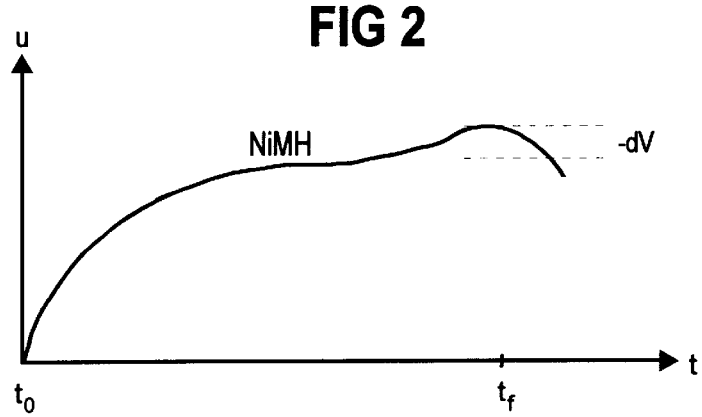
FIG. 2 is a graph illustrating time-dependent variations in terminal voltage characteristics during the charging of a NiMH-type battery.
Figure 3:
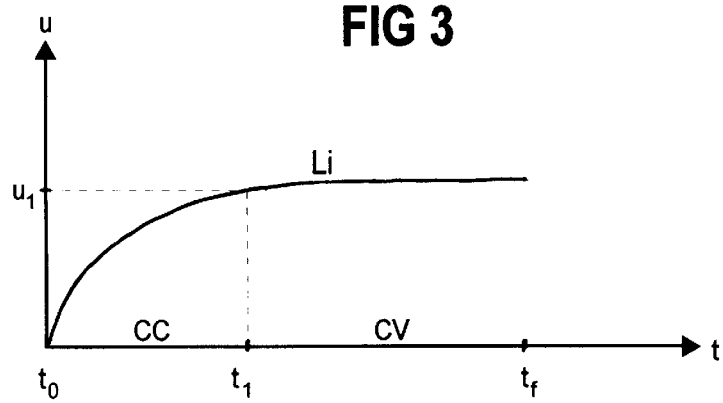
FIG. 3 is a graph illustrating time-dependent variations in terminal voltage characteristics during the charging of a lithium-type battery.

The battery cells 41a, 41b, which according to the above are assumed to be of lithium type, have nominal charging characteristics similar to the ones disclosed in FIG. 3. The second voltage converting means 60 is arranged to monitor the momentary charging status of the battery cells 41a, 41b and to transmit information relating to this charging status to the radio telephone 20 via the second battery pack terminal 44 and the radio telephone terminal 24. The radio telephone 20, and particularly its controller 21, is arranged to receive this charging information and to use the information for controlling the charging process, particularly as regards parameters such as charging current magnitude or charging voltage magnitude and point in time for ending the charging process.

Figure 5:
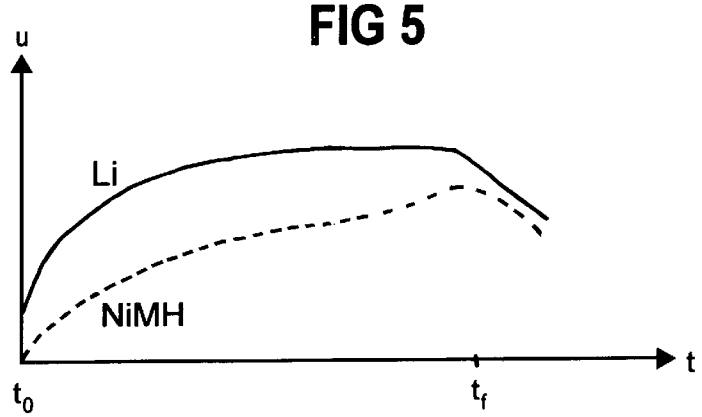
FIG. 5 is a graph illustrating one possible way of transferring charging information from the battery pack to the radio telephone during the charging of a battery pack according to a preferred embodiment of the invention.

In FIG. 5 a solid graph illustrates a first way of transferring charging information from the battery pack 40 via the second battery pack terminal 44 to the second radio telephone terminal 24 and the controller 21. When the battery cells approach a fully charged state, or have in fact already reached such a state, the second voltage converting means 60 modifies the magnitude of the supply voltage, thereby causing a characteristic decrease of the supply voltage, similar to the characteristic voltage peak of for instance a NiMH battery. As a comparison the charging characteristics for a NiMH battery is shown in the form of a dashed graph in FIG. 5.

Figure 10:
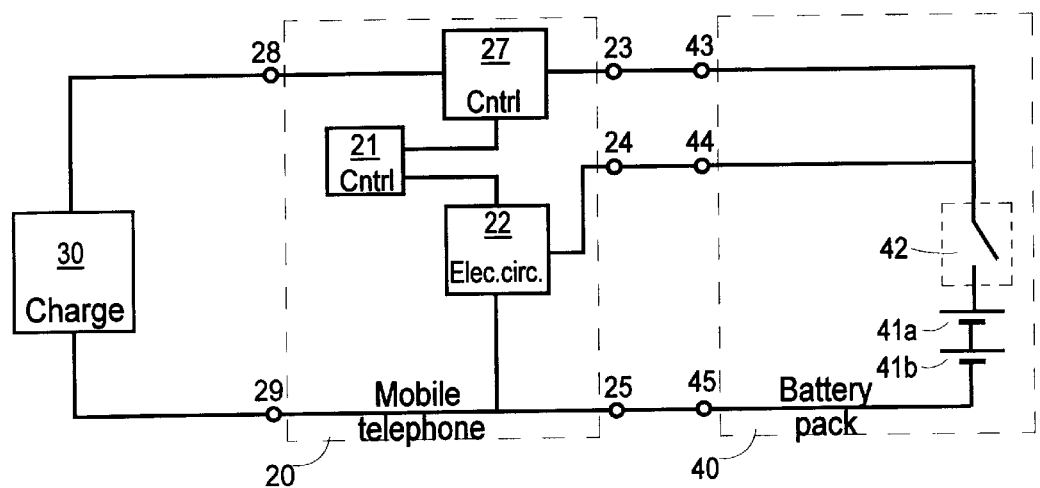
FIG. 10 is a schematic block diagram illustrating the opportunity, according to the present invention, to use several different battery types for the same radio telephone.

The controller 21, which continuously monitors the shape of the supply voltage received from the second battery pack terminal 44, will detect the characterizing decrease in voltage and in response thereof command the charging controller 27 to end the charging of the battery pack 40. The arrangement above enables a given radio telephone to use several different battery types, since the radio telephone 20 does not have to be aware of the actual battery cell type, thanks to the transmission of charging information described above, as long as the second voltage converting means 60 in the battery pack generates information about the momentary charging status, in particular the fully charged state of the battery pack. If the battery used is of such a type (e.g. NiMH), which in itself exhibit a characteristic voltage peak according to FIG. 3 and the dashed graph in FIG. 5, the voltage converting means 50 and 60 may be omitted, which is illustrated by FIG. 10.

Figure 6:
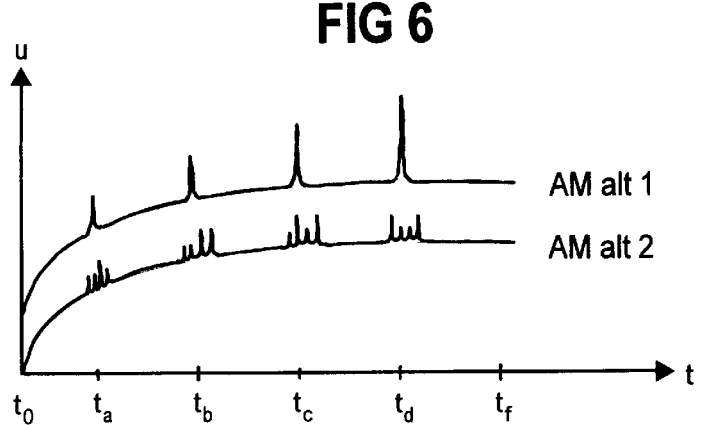
FIG. 6 is a graph illustrating alternative ways of transferring said charging information.

As an alternative to the procedure above it is possible to superimpose charging information in the supply voltage by for instance amplitude or frequency modulation. In FIG. 6 a graph is shown, representing the supply voltage u provided by the second voltage converting means 60 as a function of time. The upper graph indicates a first way of transferring amplitude-modulated charging information to the radio telephone. At given moments in time, $t_a$, $t_b$, $t_c$ and $t_d$, respectively, the second voltage converting means 60 generates a voltage pulse in the supply voltage u. The size of the pulse, i.e. the amplitude thereof in relation to the nominal supply voltage, is a function of the charging state of the battery cells 41a, 41b at each moment in time. It appears from the drawing how the amplitude of the pulses increase as a fully charged state approaches at the time $t_f$. As an alternative, which is illustrated by the lower graph in FIG. 6, a pulse train may be generated at each moment in time $t_a$, etc. The pulse train is comprised by a predetermined number of pulses—four pulses are shown in the drawing. The amplitude of the individual pulses within each pulse train may represent one of the binary values 0 or 1. For instance, a large pulse amplitude may represent the value 1, while a small pulse amplitude may represent the value 0. In the example according to the lower graph in FIG. 6 the digital information "0010" is transmitted to the radio telephone 20 at the time $t_a$. The value "0010" may in turn represent the momentary charging status of the battery cells 41a, 41b. The value "0011" is transferred at the time $t_b$, and the value "0101" is transferred at the time $t_c$, etc.

Figure 7:
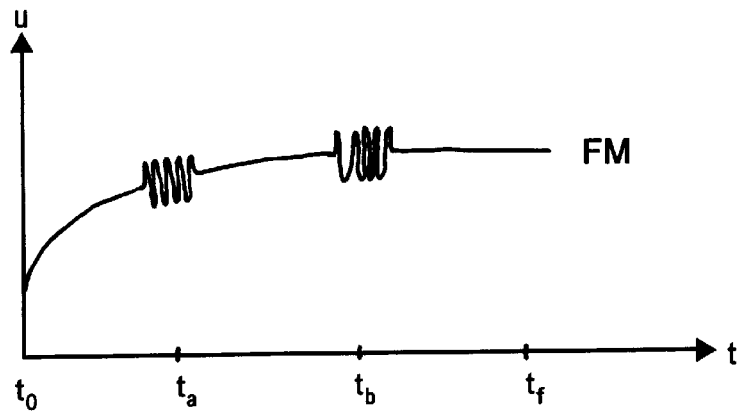
FIG. 7 is a graph illustrating yet another alternative way of transferring the charging information.

FIG. 7 illustrates the transmission of charging information by means of frequency modulation of the supply voltage u. At given moments in time $ta_a$, $t_b$, etc, a time-limited and frequency-modulated signal is transmitted, said signal being superimposed in the supply voltage u. The frequency contents of this frequency modulation may in similarity to the description above for FIG. 6 represent the momentary charging status of the battery cells 41a, 41b at each respective moment in time $t_a$, $t_b$, etc.

Figure 8:
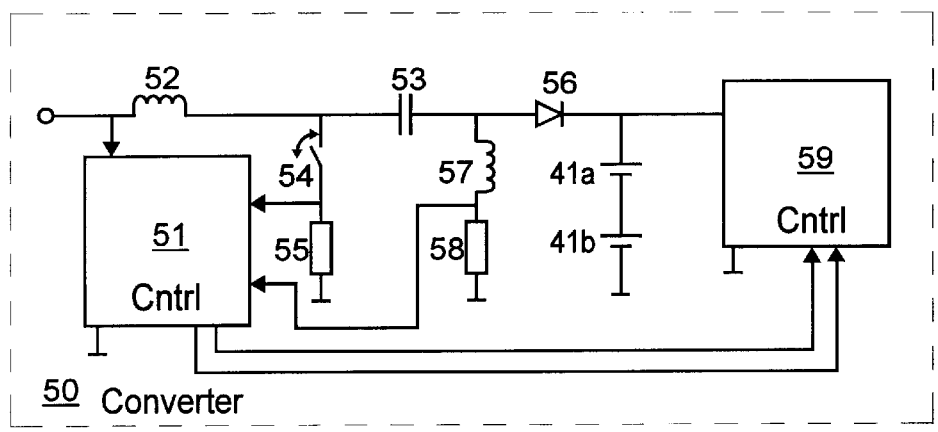
FIG. 8 is a schematic circuit diagram for a first voltage converting means used in the preferred embodiment.

FIG. 8 schematically illustrates an electric circuit diagram for one possible realization of the first voltage converting means 50, the purpose of which, according to the above, is to receive charging current from the radio telephone 20 as well as charging controlling input signals from the charging controller 27 via the radio telephone terminal 23 and the battery pack terminal 43. The arrangement is considered to be familiar to a man skilled in the technical field, or should at least lie within his normal field of expertise, and consequently the components comprised in the voltage converting means are only described in summary herein. At the input thereof the voltage converting means is provided with a first controller 51. A first coil 52 is connected at one end to a first input on the voltage converting means and is connected at its second end to a first side of a capacitor 53. A first resistor 55 is connected to ground between the coil 52 and the capacitor 53 via a semiconductor switch 54. A common node between the semiconductor switch 54 and the first resistor 55 is connected to a second input on the controller 51. The second side of the capacitor 53 is connected to the anode terminal on a diode 56. A second coil 57 is connected in series with a second resistor 58, thereby connecting a common node between the capacitor 53 and the diode 56 to ground. A common node between the second coil 57 and the second resistor 58 is connected to a third input on the first controller 51. The cathode terminal on the diode 56 is connected to the positive terminal of the first battery cell 41a and to a second controller 59.

Preferably, the semiconductor switch 54 is realized by a MOSFET transistor, the on-and-off switching of which is controlled by the first controller 51 through control means not disclosed in the drawing. The first controller 51 has bidirectional connection with the second controller 59 so as to together control the charging of the battery cells 41a, 41b.

Figure 9:
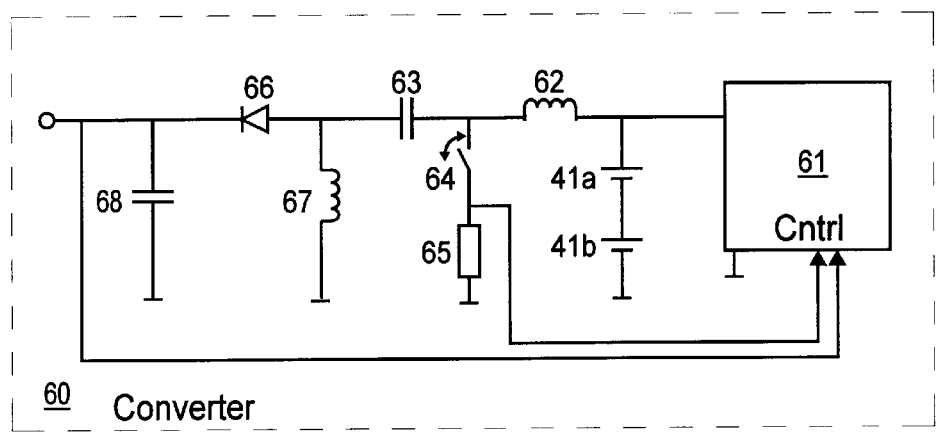
FIG. 9 is a schematic circuit diagram for a second voltage converting means used in the preferred embodiment.

FIG. 9 illustrates a schematic circuit diagram for one possible realization of the second voltage converting means 60, the purpose of which, according to the above, is to supply power to the electronic components 22 in the radio telephone 20 and to determine the momentary charging status of the battery cells 41a, 41b and transmit charging information to the radio telephone in the form of electric signals, which are superimposed in the supply voltage to the radio telephone. The second voltage converting means 60 comprises a controller 61, which is connected to the battery cells 41a, 41b and which thereby may sample the momentary terminal voltage. A first coil 62 is connected between the battery cells 41a, 41b and a first side of a first capacitor 63. In correspondence with the above a semiconductor switch 64 and a resistor 65 are connected to ground between the first coil 62 and the first capacitor 63. The voltage across the resistor 65 is fed back to a control input on the controller 61. The second side of the first capacitor 63 is connected to the anode terminal of a diode 66, the cathode terminal of which is connected to the output on the second voltage converting means 60. A second coil 67 is connected in parallel to a second capacitor 68 via the diode 66. Preferably, the semiconductor switch 64 is realized by a MOSFET-transistor, the on-and-off-switching of which is controlled by the controller 61 through control means not disclosed herein.

By this arrangement the controller 61 may sample the momentary charging status of the battery cells 41a, 41b and in response thereof modify the outgoing supply voltage as desired or provide it with superimposed electric signals, representing the detected charging status.

The embodiment of the battery pack described above uses two battery cells, the cell voltages of which together provide a battery terminal voltage, which is higher than the supply voltage suitable for driving the components 22 and which therefore is regulated to an appropriate level by means of the second voltage converting means 60. If, as an alternative, only one battery cell is used—such as a lithium cell—and if the terminal voltage is such that it may be used directly for driving the components 22, the voltage converting means 60 may be realized in a considerably easier way than the one described above.

For instance, it is possible to realize the voltage converting means 60 as a transistor circuit with a control circuit provided thereto. Being controlled by the control circuit the transistor circuit has a certain voltage drop, preferably a small one, during the charging of the battery cell. When the control circuit detects a fully charged state, the transistor circuit is switched to a condition, in which the voltage drop is larger, wherein the supply voltage received by the radio telephone will comprise the characterizing voltage drop according to FIG. 5.

The principles of the present invention, i.e. the transmission of charging status information from the battery pack to the electric apparatus (for instance a radio telephone), so as to provide a standardized interface there between, may also be used in applications with only two connections between apparatus and battery pack, even if the schematic solutions shown in the drawings and the description may have to be modified in a way, which is regarded to be within the field of expertise for a man skilled in the art.

Consequently, the invention has been described above by way of embodiment examples only, and the invention may be modified in several ways within the scope of protection, as defined by the appended patent claims.

What is claimed is:

1. A battery pack for a portable electric apparatus, comprising:
   at least one battery cell,
   a first terminal for receiving charging current from the apparatus,
   a second terminal for feeding supply current to the apparatus,
   a third terminal for establishing a ground line common to the apparatus and the battery pack,
   a first voltage controller arranged between the first terminal and the at least one battery cell, and
   a second voltage controller arranged between the second terminal and the at least one battery cell.

2. The battery pack of claim 1, wherein the first voltage controller comprises control means for receiving charging controlling electric signals from the apparatus and for controlling, in response thereto, a magnitude of at least one of the charging current and the charging voltage to the at least one battery cell.

3. The battery pack of claim 1, wherein the second voltage controller comprises control means for generating electric signals representative of charging information, the electric signals being transmitted to the apparatus through the second terminal.

4. The battery pack of claim 3, wherein the electric signals have voltage-time characteristics that at least partly correspond to characteristics of a type of battery cell different from the at least one battery cell.

5. The battery pack of claim 3, wherein the electric signals have a negative voltage derivative when the at least one battery cell at least approximately has reached a fully charged state.

6. The battery pack of claim 3, wherein the control means modulates an amplitude of the electric signals as a function of momentary charging status of the at least one battery cell.

7. The battery pack of claim 3, wherein the electric signals include short pulses that have sizes which are a function of a momentary charging status of the at least one battery cell.

8. The battery pack of claim 3, wherein the control means modulates a frequency of the electric signals as a function of momentary charging status of the at least one battery cell.

9. The battery pack of claim 1, further comprising a safety device arranged between the at least one battery cell and the first and the second terminals.

10. The battery pack of claim 1, wherein the third terminal is arranged, when the battery pack is removed from the apparatus, to maintain electric connection with the apparatus until electric connections between the apparatus and the first and the second terminals have been interrupted.

11. A radio telephone, comprising a first terminal for connection to the first terminal in a battery pack according to claim 1, a second terminal for connection to the second terminal of the battery pack according to claim 1, and a third terminal for connection to the third terminal of the battery pack according to claim 1.

12. The battery pack of claim 1, wherein current flows in only a first direction through the first terminal and in only a second direction through the second terminal.

13. A method of charging at least one battery cell in a battery pack for a portable electric apparatus, comprising the steps of:
   supplying charging current/voltage and charging control information from the apparatus to the battery pack via a first terminal;
   supplying supply current/voltage and information about momentary charging status of the at least one battery cell from the battery pack to the apparatus via a second terminal; and,
   establishing a ground line common to the apparatus and the battery pack via a third terminal.

14. The method of claim 13, wherein the charging current/voltage and charging control information are supplied via a first pair of terminals, and the supply current/voltage and information about momentary charging status of the at least one battery cell are supplied via a second pair of terminals.

15. The method of claim 13, wherein the information about momentary charging status is supplied as an electric signal superimposed in the charging current/voltage.

16. The method of claim 13, wherein the charging current/voltage is modulated so that voltage time characteristics thereof at least partly correspond to characteristics of a type of battery cell different from the at least one battery cell.

17. The method of claim 13, wherein current/voltage flows in only a first direction through the first terminal and in only a second direction through the second terminal.

* * * * *